Sept. 21, 1971        E. G. PARKER        3,606,629

SYMMETRICAL OVERLAP

Filed May 14, 1970

INVENTOR.
Eric G. Parker
BY
W. A. Schuetz
ATTORNEY

United States Patent Office 3,606,629
Patented Sept. 21, 1971

3,606,629
SYMMETRICAL OVERLAP
Eric G. Parker, Kettering, Ohio, assignor to General Motors Corporation, Detroit, Mich.
Filed May 14, 1970, Ser. No. 37,213
Int. Cl. B60s 1/26
U.S. Cl. 15—250.21
4 Claims

ABSTRACT OF THE DISCLOSURE

In a preferred form, this disclosure relates to a windshield wiping apparatus in which the windshield wiper is simultaneously pivoted and moved transversely of the windshield between inboard and outboard positions. The windshield wiping apparatus includes a drive mechanism having a pinion gear which is in meshed engagement with fixed and movable racks and which is reciprocated to cause the movable rack to be reciprocated and a wiper connected to the rack to be moved transversely of the windshield. The drive mechanism further includes a linkage means operatively connected with the wiper to cause the latter to pivot between its inboard and outboard positions in response to reciprocal movement being imparted to the movable rack.

---

The present invention relates to a windshield wiping apparatus, and in particular to a windshield wiping apparatus in which a windshield wiper is simultaneously pivoted and moved transversely of a windshield between inboard and outboard positions.

Heretofore, windshield wiper mechanisms have been provided wherein the windshield wiper is not only pivoted or oscillated between inboard and outboard positions but also simultaneously moved transversely of the windshield. This type of wiper mechanism increases the area of the windshield which is wiped.

The present invention provides a new and improved actuating mechanism for simultaneously pivoting and transversely moving a windshield wiper between inboard and outboard positions.

Accordingly, a broad object of the present invention is to provide a new and improved actuating mechanism for simultaneously pivoting and transversely moving a windshield wiper across the outer surface of a windshield between inboard and outboard positions.

Another object of the present invention is to provide a new and improved windshield wiping mechanism for simultaneously pivoting and transversely moving a windshield wiper across the outer surface of the windshield between inboard and outboard positions and which includes a movable rack to which the windshield wiper is pivotally connected, a fixed rack, a pinion gear in meshed engagement with the movable and fixed racks, a drive means for reciprocating the pinion gear through fixed strokes to effect reciprocation of the movable rack at a speed greater than the speed at which the pinion is being reciprocated and to cause the wiper to be moved transversely of the windshield, and a linkage means operatively connected with the wiper for causing the same to be pivoted in response to reciprocal movement being imparted to said movable rack.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
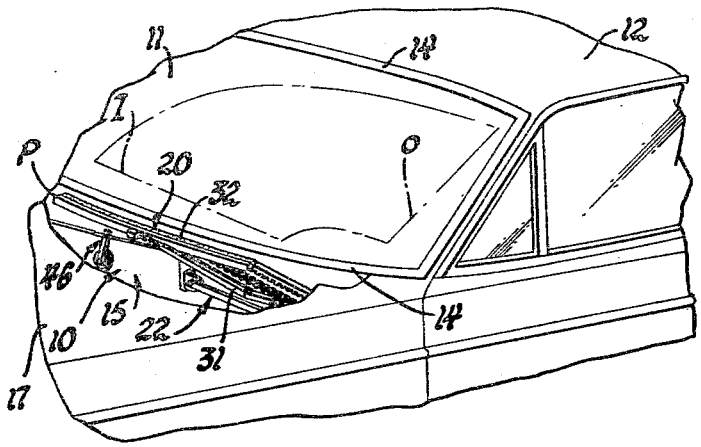
FIG. 1 is a fragmentary perspective view of an automotive vehicle embodying the novel windshield wiping apparatus of the present invention.

As representing a preferred embodiment of the present invention, the drawings show a windshield wiping apparatus 10 for wiping the outer surface of a windshield 11 of an automotive vehicle 12. The windshield has a reveal molding 14 extending around its outer edge. The vehicle includes suitable body structure 15 for supporting the windshield 11 and which defines a well or recess 16 adjacent the lower edge of the windshield 11. The vehicle 12 also includes a forwardly extending hood 17 whose rearward edge 17a is located forwardly of the windshield 11 to define an elongated slot 18 extending transversely of the vehicle and which is in communication with the well 16.

The windshield wiping apparatus 10 is disposed within the well 16 and is supported by the body structure 15. The windshield wiping apparatus 10 comprises, in general, a pair of windshield wipers 20 (only one of which is shown) and an actuating mechanism 22 for simultaneously pivoting and transversely moving the windshield wipers 20 between an inboard position I and an outboard position O during running operation thereof. The actuating mechanism 22 is preferably also operable to move the wipers 20 between their inboard position I and a park position P when running operation is terminated. The wipers 20 pass through the slot 18 and are located within the well 16 so as to be concealed from view when in their park position P, as shown in FIG. 1.

The windshield wipers 20 (only one of which is shown) could be of any suitable or conventional construction and are hereinshown as comprising a wiper arm 31 and a wiper blade assembly 32 connected to the wiper arm 31 at its upper end. The wiper arm 31 includes spring hinge connected inner and outer sections 31a and 31b for biasing the wiper blade assembly 32 into engagement with the windshield 11. The inner section 31a of the wiper arm 30 is drivingly connected to a drive pivot 34 rotatably supported by a movable rack 40 of the actuating mechanism 22.

The actuating mechanism 22 generally comprises a rack and pinion drive arrangement 35 for reciprocating the windshield wiper 20 transversely of the windshield and a linkage means 36 operatively connected with the drive pivot 34 for pivoting the wiper 20 as it is being moved transversely of the windshield 11. The rack and pinion drive arrangement 35 comprises the movable rack 40, a fixed rack 42, a pinion gear 44 and a drive means 46 for reciprocating the pinion gear 44. The movable rack 40 carries a pair of rollers 48 which are in rolling engagement with the bottom surface of a guide means 50, the guide means 50 being suitably secured to the body structure 15 of the vehicle 12. The guide means 50 guides the movable rack 40 for linear movement in opposite directions. The fixed rack 42 is suitably secured to the body structure of the vehicle. The racks 40 and 42 extend transversely and downwardly with respect to the lower edge of the windshield as well as parallel to each other. The racks 40 and 42 extend linearly and have spaced gear teeth 40a and 42a along their entire lengths. The pinion gear 44 is in meshed engagement with the teeth 42a of the fixed rack 42 and the teeth 40a of the movable rack 40.

The pinion gear 44 is adapted to be linearly reciprocated through fixed strokes by the drive means 46. The drive means 46 includes a wiper motor and gear reduction unit 55 whose output shaft is connected to one end of a crank arm 56. The drive means 46 further includes a drive link 58 having one end pivotally connected to the other end of the crank arm 56 and its other end pivotally connected to the pinion gear 44.

Although only the rack and pinion drive arrangement 35 for actuating the wiper 20 for the driver's side of the vehicle 12 has been shown, it should be understood that the same arrangement would be provided for actuating the wiper for the passenger side of the vehicle 12.

During running operation the wiper motor 55 rotates the crank arm 56, which in turn causes the drive link 58 and the pinion gear 44 to be linearly reciprocated through fixed strokes. The pinion gear 44 in response to being reciprocated and as a result of its meshed engagement with the fixed rack 42 is also caused to be rotated. The combined reciprocable and rotary motion imparted to the pinion gear 44 causes the movable rack 40 to be linearly reciprocated and at a speed twice the rate of speed at which the pinion gear 44 is being reciprocated. Movement of the rack 40 causes the wiper 20 to be moved transversely of the vehicle.

Figure 2:
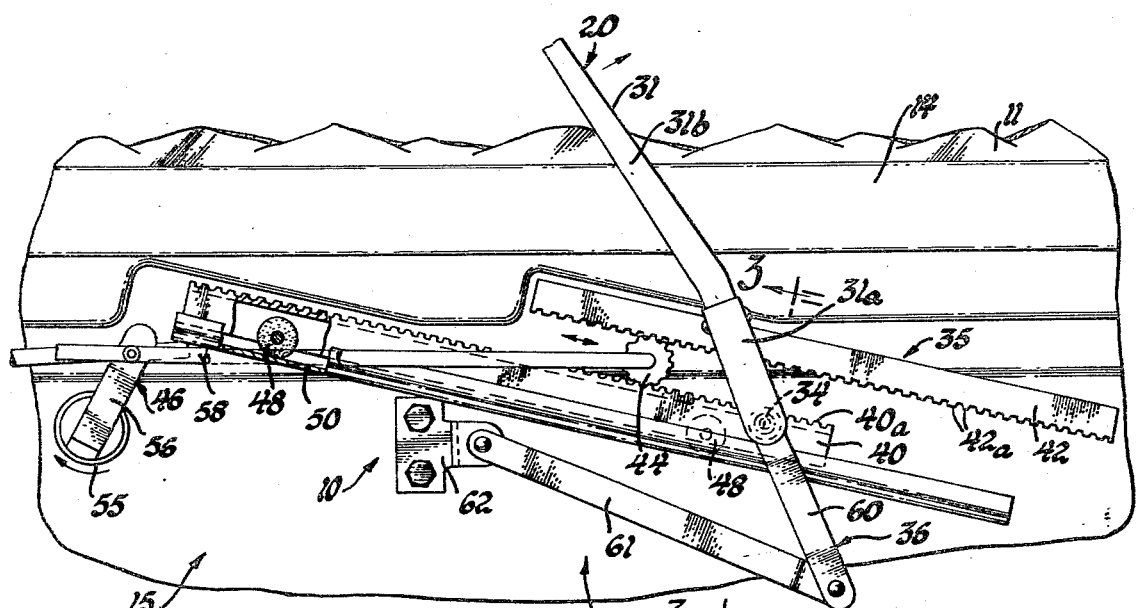
FIG. 2 is an enlarged fragmentary view of part of the windshield wiping apparatus.
Figure 3:
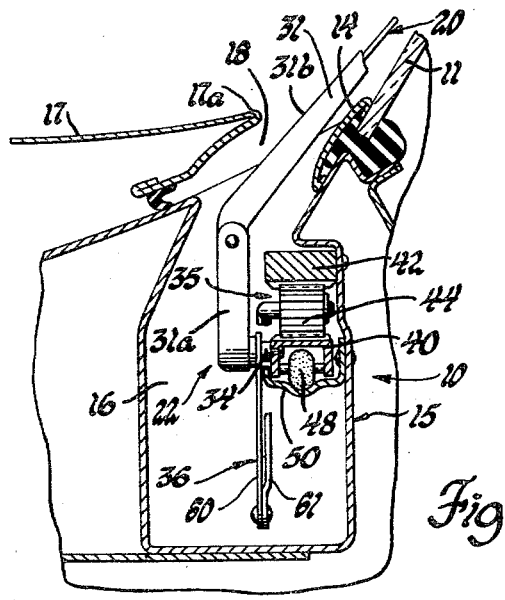
FIG. 3 is a fragmentary sectional view taken approximately along line 3—3 of FIG. 2.

As the wiper is being moved transversely of the vehicle it is simultaneously pivoted between its inboard and outboard positions by the linkage means 36. The linkage means 36 comprises a first link 60 having one end fixed to the drive pivot 34 and a second link 61 having one end pivotally connected to a fixed bracket 62 secured to the body structure 15 and its other end pivotally connected to the other end of the first drive link 60. During movement of the wiper 20 toward the right, as viewed in FIG. 2, the linkage means 36 causes the wiper 20 to be pivoted through its outboard stroke. During movement of the wiper 20 toward the left, the linkage means 36 causes the wiper to be pivoted through its inboard stroke.

From the foregoing, it should be apparent that in response to reciprocable movement being imparted to the movable rack 40, the wiper 20 is caused to be moved transversely of the windshield. It should also be apparent that in response to this reciprocable movement, the linkage means 36 causes the wiper to be pivoted between its inboard and outboard positions. The combined transverse and pivotal movement of the wiper 20 results in a greater area of the windshield being cleaned as compared to a conventional oscillatory wiper.

The wiper motor and gear reduction unit 55 is preferably of the type disclosed in U.S. Pat. No. 3,253,206, dated May 24, 1966, and assigned to the same assignee as the present invention. As described in this patent, the unit 55 includes means for changing the throw of the crank arm to effect movement of the wiper between its parked and inboard positions upon initiating and terminating operation of the wiper apparatus.

It should also be understood that the fixed and movable racks could be disposed so as to extend parallel to the lower edge of the windshield and that an articulating link having one end pivotally connected to the movable rack and the other end pivotally connected to the wiper blade assembly for pivoting the wiper blade assembly about an axis normal to the window could be used.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield wiping apparatus for wiping the outer surface of a windshield of an automotive vehicle comprising: a wiper; and an actuating mechanism connected with said wiper for simultaneously pivoting and transversely moving the wiper between inboard and outboard positions, said actuating mechanism comprising a fixed toothed rack, a movable toothed rack adjacent said fixed rack and supported for reciprocal movement in opposite directions, a pivot means carried by said movable rack and connected to said wiper, a pinion gear in meshed engagement with said fixed and movable racks, drive means operatively connected with said pinion gear for reciprocating said pinion gear, said pinion gear being caused to rotate by said fixed rack in response to being reciprocated whereby said movable rack is reciprocated at a linear speed greater than the linear speed at which the pinion is being reciprocated, said movable rack causing said wiper to be moved transversely of said windshield when reciprocated, and linkage means operatively connected with said pivot means to cause said wiper to be pivoted thereabout in response to the wiper being moved transversely by said movable rack.

2. In combination, an automotive vehicle having a body structure, a windshield supported by the body structure and a windshield wiping apparatus for wiping the outer surface of the windshield of the automotive vehicle comprising: a windshield wiper; and an actuating mechanism connected with said wiper for simultaneously pivoting and transversely moving said windshield wiper back and forth between inboard and outboard positions; said drive mechanism comprising a fixed toothed rack carried by said vehicle body structure adjacent the lower edge of the windshield; guide means carried by said vehicle body structure adjacent said fixed rack; a movable tooth rack adjacent said fixed rack and guidably supported for reciprocal movement in opposite directions by said guide means; pivot means carried by said movable rack and connected with said windshield wiper; a pinion gear in meshed engagement with both said fixed and movable racks; drive means operatively connected with said pinion gear for reciprocating the latter through fixed strokes, said pinion being caused to rotate by said fixed rack in response to being reciprocated whereby said movable rack is reciprocated at a linear speed greater than the linear speed at which the pinion gear is being reciprocated, said movable rack causing said wiper to be moved transversely of said windshield when reciprocated, a first link having one end fixed to said pivot means, a second link having one end pivotally connected to a fixed pivot and its other end pivotally connected to the other end of said first link, said links causing said wiper to be pivoted about said pivot means in response to said wiper being moved transversely of said windshield by said movable rack.

3. The combination defined in claim 2 and wherein said drive means includes a rotatable crank arm having one end pivotally connected to a drive link and wherein said drive link has its other end pivotally connected to said pinion gear.

4. The combination defined in claim 2 wherein said fixed and movable racks are disposed transversely and downwardly with respect to the lower edge of the windshield.

References Cited

UNITED STATES PATENTS

| | | | |
|---|---|---|---|
| 2,172,488 | 9/1939 | Waters | 15—250.21 |
| 3,078,494 | 2/1963 | Price | 15—250.17 |
| 3,505,702 | 4/1970 | Omlie et al. | 15—250.24X |

PETER FELDMAN, Primary Examiner

U.S. Cl. X.R.

15—250.29, 250.3; 74—70